April 12, 1932. E. P. GUNDRY 1,853,608
LUGGAGE RACK
Filed Aug. 24, 1928 3 Sheets-Sheet 1

Inventor
Eldon P. Gundry
By Blackmore, Spencer & Hulé
Attorneys

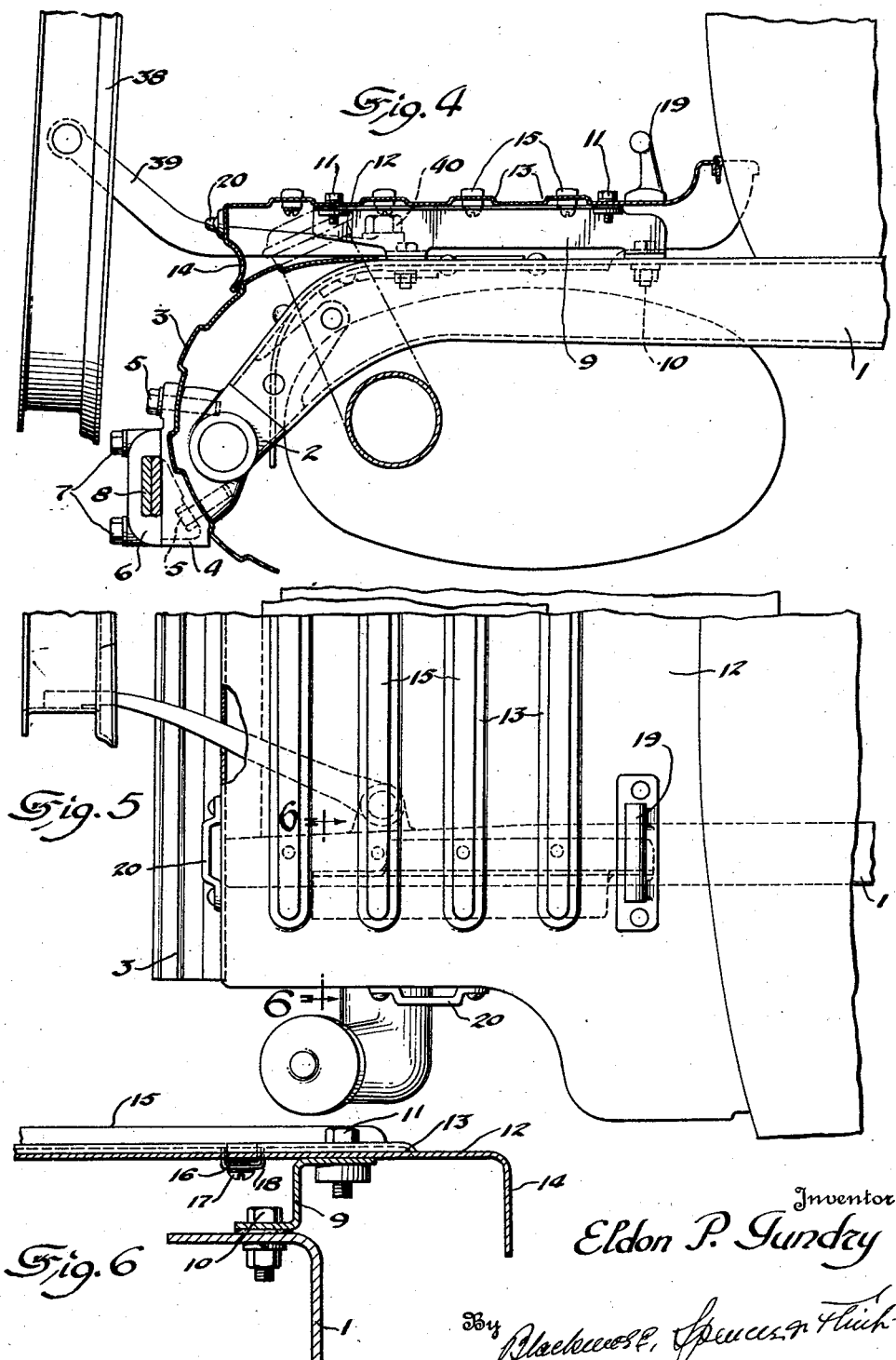

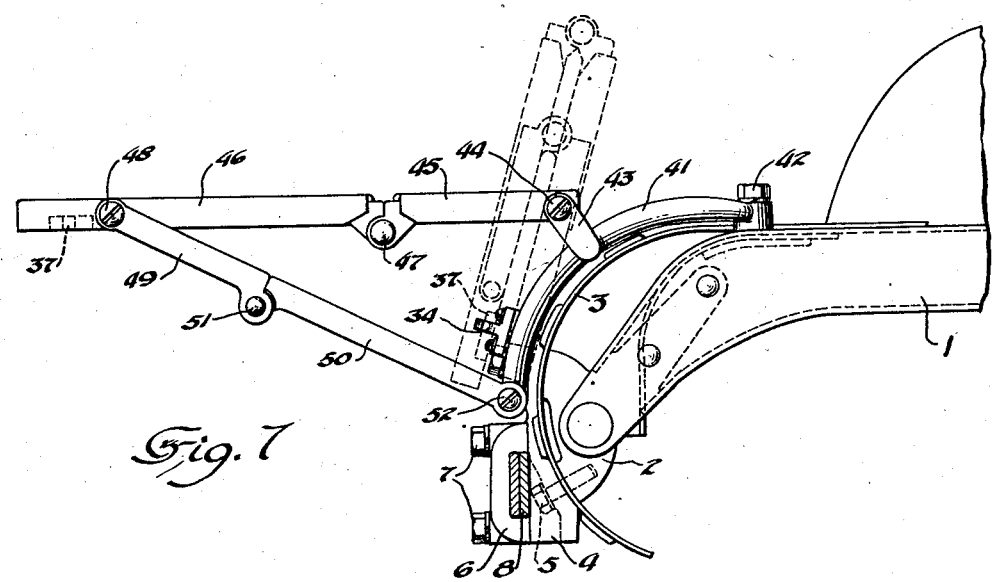

Patented Apr. 12, 1932

1,853,608

UNITED STATES PATENT OFFICE

ELDON P. GUNDRY, OF FLINT, MICHIGAN, ASSIGNOR TO GENERAL MOTORS CORPORATION, OF DETROIT, MICHIGAN, A CORPORATION OF DELAWARE

LUGGAGE RACK

Application filed August 24, 1928. Serial No. 301,712.

This invention relates to luggage carriers for motor vehicles.

It is among the objects of the invention to provide a carrier that may be manufactured from a few simple parts of low cost, and which will be sturdy in construction, and of a size to accommodate an unusually large amount of luggage so as to eliminate, as far as possible, the necessity for loading trunks, bags and parcels in the passenger compartment during travel, thus making for greater comfort and obviating wear and damage to the interior of the vehicle body and which, furthermore, is of pleasing appearance so as to lend a certain ornamental effect to the rear end of the vehicle, whether or not the rack is being used.

In one embodiment of the invention a load carrying platform is supported by the chassis frame over the fuel tank at the rear of the vehicle body and with it is associated an auxiliary collapsible section that may be extended to afford increased load carrying space should such be desired. In some instances however, the main or fixed platform alone may be employed, and in other cases the collapsible platform section may be used by itself.

The invention will be more fully understood upon reference to the accompanying drawings wherein, Figure 1 is a side elevation of a rear portion of the motor vehicle with which is associated the luggage carrying platform constituting the present subject matter.

Figure 4 is a side elevation, partly in section, of an alternative form of the carrier.

Figure 5 is a top plan view of the structure shown in Figure 4.

Figure 6 is a section on line 6—6 of Figure 5.

Figure 7 is a side elevation of another alternative form and,

Figure 8 is a top plan view of the structure shown in Figure 7.

Figure 1:
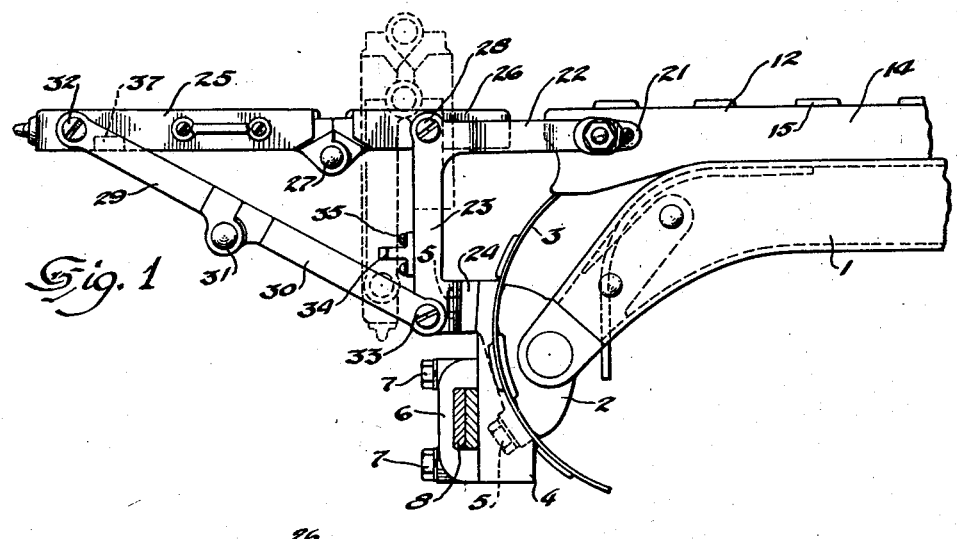
Figure 2:
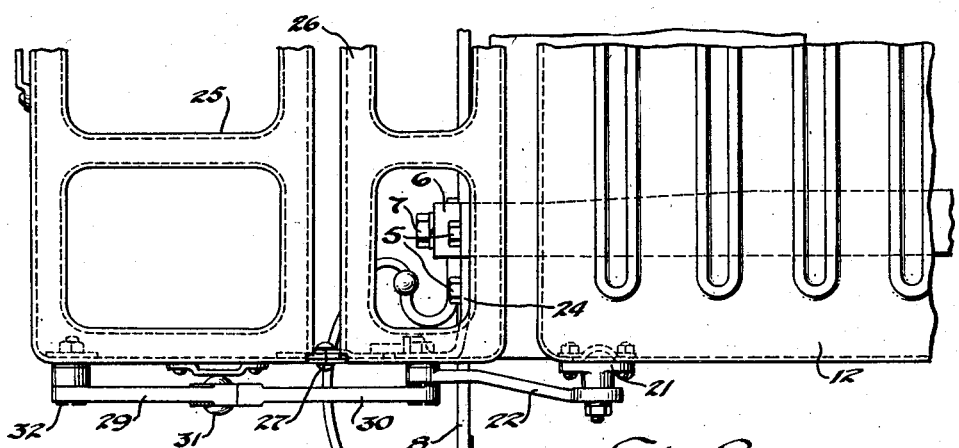
Figure 2 is a top plan view showing substantially one half of the platform of Figure 1.
Figure 3:
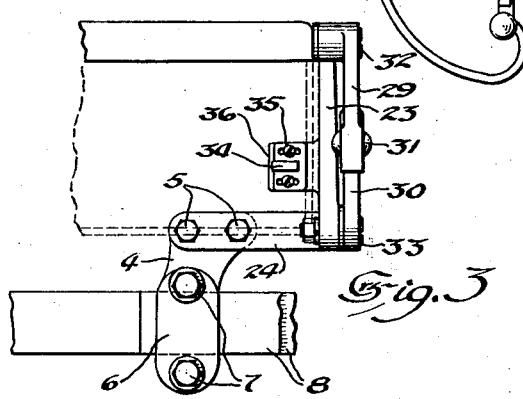
Figure 3 is a fragmentary rear elevation of the platform shown in Figures 1 and 2.

In the drawings, the reference character 1 indicates one of a pair of channel shaped longitudinally extending chassis frame members having a down-turned horn in which is secured a cast or forged metal bracket 2. An arcuate cover plate 3 extends over the rear end of the chassis frame member and is secured by a member 4 fastened to the bracket 2 by means of bolts 5. A clamp plate 6 held by bolts or studs 7 to the member 4 serves to mount the bars 8 of a bumper or impact cushioning fender at the rear of the vehicle. Positioned over the chassis frame members, as most clearly shown in Figure 4, is the main or stationary luggage supporting platform that is supported by means of a pair of Z-shaped bars 9 secured by bolts or studs 10 to the top flange of the chassis member 1 and having fastened thereto by bolts 11 a panel 12, preferably stamped or pressed from sheet metal and having reinforcing ribs or beads 13 in the top thereof, and dependent stiffening flanges 14 at the sides and rear thereof, which extend down below the top of the chassis frame, thereby affording a finished appearance to the platform. Stiffening bars 15, which are preferably plated and high polished for contrast with dull finish or dark paint on the panel 12, are provided with lugs 16 (see Fig. 6) which extend down through openings in the beads 13 and have fastening screws 17 threaded therein for engagement with U-shaped clamps 18 to secure the bars in place. Brackets such as indicated at 19 may be bolted or riveted to the top 12 and clips 20 riveted to the dependent flanges 14, for the attachment of hold-down straps to anchor the baggage in place.

Secured to the side of the stationary or main platform is a bracket 21 to which is attached one leg 22 of an L-shaped bracket, the other leg 23 having at its lower end a laterally extending lug 24 fastened by the studs 5 to the member 4. The auxiliary or collapsible platform consists of the sections 25 and 26 hinged together at 27, the foremost section 26 being pivoted by a stud 28 to the bracket 22, and the rearmost section 25 being braced by a jointed link consisting of the bars 29 and 30 hinged at 31, the bar 29 being pivoted at 32 adjacent the rear of the section 25 and the link 30 pivotally connected by a stud 33 to the lower portion of the leg 23. In its extended position the collapsible platform forms a continuation of the main load carrying section, and affords quite a large space for mounting baggage. When the auxiliary section is not in use it may be folded to the dotted line position indicated in Figure 1 at which time it is held against accidental distention by means of a hook-shaped lug 34 secured by screws 35 passing through slots in the base of the lug and entering a laterally projecting portion 36 integral with the leg 23, which hook engages with a lug 37 on the platform section 25.

In the event the car purchaser or owner does not feel the need for the added space afforded by the collapsible or auxiliary platform, this obviously may be omitted, as is illustrated in Figure 4, and in such event it may be desirable to mount a spare tire carrier behind the platform. This alternative is illustrated by the ring or band 38 mounted on bracket arms 39 that extend through an opening in the rear flange 14 and are secured by bolts 40 to a plate carried by the top flange of the chassis frame member 1.

If the motor car is to be equipped with the collapsible section only, an arcuate bracket 41, as in Figure 7, is secured at one end by the stud 42 to the top of the chassis frame, and at its lower end by the studs 5 to the member 4. At an intermediate point in the bracket 41 an arm 43 extends upwardly and is pivotally connected by the stud 44 to the foremost platform section 45. The rearmost section 46 is pivoted at 47 to the section 45 and at 48 to the jointed brace link 49—50, hinged at 51, extending rearwardly and upwardly from the lower portion of the bracket 41 where it is pivotally connected by the stud 52. In its folded position, indicated by dotted lines, the hook 34 and lug 37 are interlocked one with the other to hold the parts in such collapsed state.

Various changes in the structure described may be made as will readily occur to those skilled in the art.

I claim:

1. In a motor vehicle, the combination of chassis frame members having downturned ends, a stationary luggage carrying platform mounted on the chassis frame members adjacent said ends, a bracket connected at opposite ends with the platform and a downturned frame end respectively, a collapsible platform extension comprising a pair of hinged sections, means to pivotally connect the foremost section with an intermediate portion of said bracket, and a jointed brace link connecting the rearmost section and the downturned frame end.

2. In a motor vehicle, the combination of chassis frame members having downturned ends, a pair of brackets, each connected at its opposite ends with a downturned chassis frame end and with a part adjacent the upper portion of the frame member spaced from the end, respectively, a collapsible luggage carrying platform comprising hinged sections, pivotal connections between the foremost section and intermediate portions of said brackets, and a pair of jointed links, each pivotally connected with the rearmost platform section and a portion of a bracket adjacent a downturned frame end.

3. The structure of claim 2 and in addition thereto, means to lock the sections in collapsed relation including a hooked member means to adjustably mount said member on the bracket and a lug on one of the sections that is adapted to engage with said hooked member.

4. The structure of claim 2, and in addition thereto, means to hold the sections in collapsed position, including a pair of interlocking elements carried respectively by the brackets and one of said sections and adapted for engagement with each other to lock the last mentioned section to the bracket.

5. In a motor vehicle, the combination of a pair of chassis frame members, a luggage carrying platform carried thereby, including a pair of Z-shaped supports secured one on each frame member, and a plate extending across and beyond said supports and having dependent side and rear flanges extending below the top of the frame members and the bottom of said supports to conceal the supports.

6. In a motor vehicle, the combination of a pair of chassis frame members, of a luggage rack mounted thereon, including supporting bars fastened to said frame members, a sheet metal panel laid across said bars, and having dependent side flanges projecting downwardly below the bottom of the bars, and stiffening ribs formed in the top thereof, and a collapsible extension associated with said rack to form a continuation thereof.

7. In a motor vehicle, the combination with a pair of chassis frame members, of a luggage carrying platform mounted on the frame members, including a sheet metal panel extending across the frame member, stiffening ribs formed in the top of said panel and reinforcing bars secured to the upper portions of said ribs, and a collapsible extension associated with said platform.

8. In a motor vehicle, a pair of chassis frame members, a luggage rack comprising a load carrying platform having dependent flanges at its margins, supporting bars connecting the platform to said chassis frame members and lying wholly within the space on the underside of the platform between said dependent marginal flanges so as to be completely concealed.

In testimony whereof I affix my signature.

ELDON P. GUNDRY.